United States Patent [19]

Miyazaki et al.

[11] Patent Number: 4,780,771
[45] Date of Patent: Oct. 25, 1988

[54] HIGH DENSITY SIGNAL RECORDING AND REPRODUCING APPARATUS

[75] Inventors: Ken Miyazaki; Keiichi Kaneko, both of Yokohama, Japan

[73] Assignee: Victor Company of Japan, Ltd., Japan

[21] Appl. No.: 102,282

[22] Filed: Sep. 28, 1987

Related U.S. Application Data

[63] Continuation of Ser. No. 768,349, Aug. 22, 1985, abandoned.

[30] Foreign Application Priority Data

Aug. 27, 1984 [JP] Japan .................. 59-177751

[51] Int. Cl.$^4$ .......................... G11B 5/09; G11B 15/46
[52] U.S. Cl. ........................................ 360/48; 360/73
[58] Field of Search ...................... 360/48, 73

[56] References Cited

U.S. PATENT DOCUMENTS 4,314,287 2/1982 Freeman et al. ................ 360/51
4,357,635 11/1982 Hasegawa ....................... 360/45

*Primary Examiner*—Vincent P. Canney

*Attorney, Agent, or Firm*—Andrus, Sceales, Starke & Sawall

[57] ABSTRACT

A high density signal recording and reproducing apparatus comprises a disc drive comprising for recording and reproducing with an existing recording format a digital signal on and from a disc rotating at a rotational speed which is 1/N times a standard rotational speed, a circuit for generating N index pulses in one revolution time period of the disc, a selecting circuit for generating a selecting instruction which selects and designates an arbitrary track part on and from which the digital signal is to be recorded and reproduced out of N track parts of one track, a circuit responsive to the selecting instruction for generating a switching signal and an operation stop signal for stopping a recording or reproducing operation of the disc drive during a scanning period in which the remaining N-1 track parts excluding the arbitrary track part are scanned, and for passing out of the N index pulses in one revolution time period of the disc only one index pulse corresponding to the arbitrary track part, and a circuit responsive to the switching signal for selectively passing and supplying the reproduced digital signal to the selecting circuit only during a time period in which the digital signal is reproduced from the arbitrary track part.

5 Claims, 5 Drawing Sheets

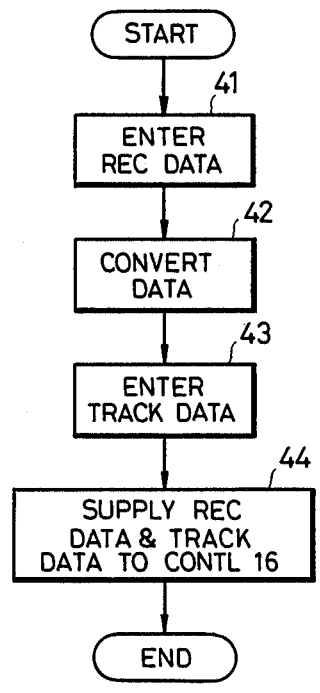
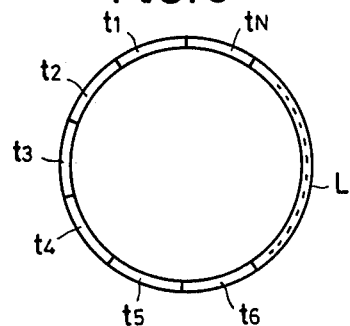
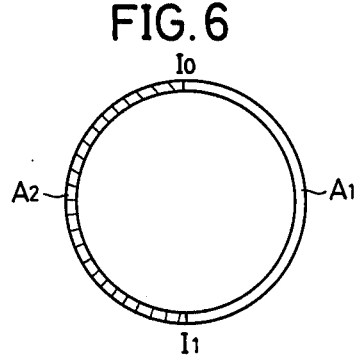
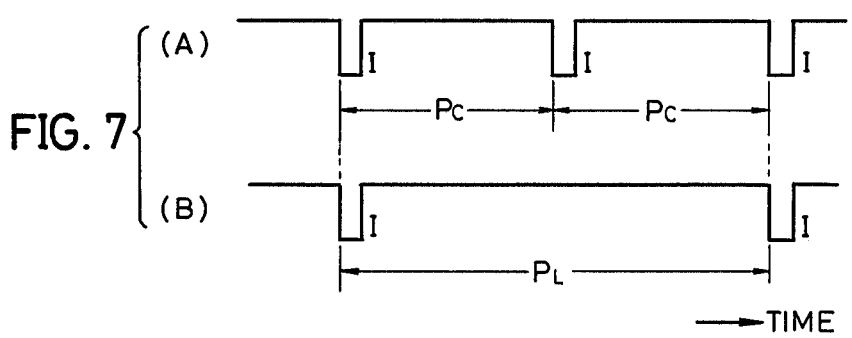

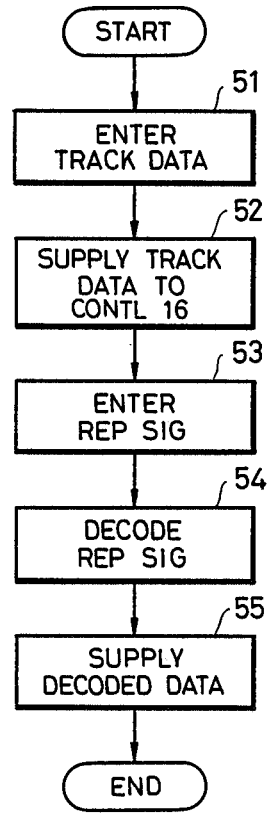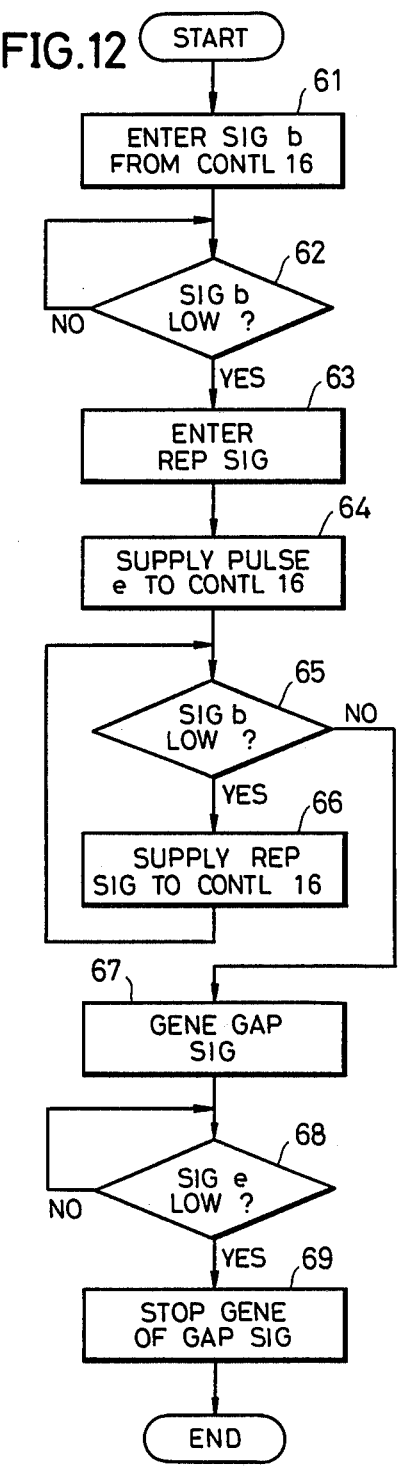

HIGH DENSITY SIGNAL RECORDING AND REPRODUCING APPARATUS

The present application is a continuation application of U.S. patent application Ser. No. 768,349, filed Aug. 22, 1985 and now abandoned.

BACKGROUND OF THE INVENTION

The present invention generally relates to high density signal recording and reproducing apparatuses, and more particularly to a recording and reproducing apparatus which records and reproduces a digital signal on and from a recording medium such as a floppy disk and a Winchester disc with a high density by use of an existing recording format.

Recently, floppy discs such as the 8-inch and 5.25-inch discs are used as recording mediums for personal computers and office computers. When the usable range (maximum usable radius minus minimum usable radius) of the disc is represented by F inch and the track density is represented by D track/inch, the usable number A of tracks on one side of the disc can be obtained by the following equation (1).

$$A = (F/D) + 1 \text{ (tracks)} \quad (1)$$

When the memory capacity per track is represented by B bytes, the total memory capacity M on one side of the disc can be obtained by the following equation (2).

$$M = B \times A \text{ (bytes)} \quad (2)$$

A standard format is set for a floppy disc drive which plays the floppy disc, and the digital signal is recorded on the disc with a predetermined recording format. For example, the memory capacity B per track (format capacity per track) of the 3.5-inch and 5.25-inch discs is approximately equal to 4 kilobytes, and the memory capacity B per track of the 8-inch disc is approximately equal to 6.6 kilobytes. In addition, the data transfer speed S of the 3.5-inch and 5.25-inch discs is approximately equal to 250 kilobits/second, and the data transfer speed S of the 8-inch disc is approximately equal to 500 kilobits/second, for example.

The memory capacity B per track and the data transfer speed S are fixed in the floppy disc drive, and the operating system operates under the fixed condition. Accordingly, the total memory capacity M on one side of the disc is conventionally increased by increasing the number A of tracks used on one side of the disc, that is, by increasing the track density D. The total memory capacity of the Winchester disc is conventionally increased similarly.

Hence, in order to improve the linear recording density (bit/inch) of the disc, the minimum usable radius on the disc is reduced by downsizing the disc. Thus, in addition to the 8-inch disc, smaller discs such as the 5.25-inch, 3.5-inch, and 3-inch discs have been developed. As a result, the increase in the total memory capacity M on one side of the disc is not perfectly proportional to the improvement in the track density and the linear recording density.

Description will now be given for a case where a linear recording density which is N times that of the conventional disc is to be obtained, where N is an integer greater than one. When it is assumed that the size of the disc is identical to that of the conventional 5.25-inch disc and the data transfer speed S is the same as that of the conventional 5.25-inch disc, the memory capacity B per track becomes equal to $4 \times N$ (kilobytes). Accordingly, when the track density D and the number A of tracks on one side of the disc are identical to those of the conventional disc, the total memory capacity M on one side of the disc becomes equal to $4 \times N \times A$ (kilobytes) from the equation (2), and the total memory capacity M on one side of this disc becomes N times that of the conventional 5.25-inch disc. However, the memory capacity B per track of this disc also becomes N times that of the conventional 5.25-inch disc, and the digital signals reproduced from this disc cannot be processed by use of the conventional (existing) operating system. In other words, in order to record and reproduce the digital signal on the disc with a high density, the memory capacity B per track, the data transfer speed S and the like must be changed, and the operating system must be changed accordingly. Therefore, the above disc for high density recording and reproduction uses a recording format completely different from the existing recording format, and the disc is only playable on a recording and reproducing apparatus which employs the new system. For this reason, there is a problem in that such a disc for high density recording and reproduction is not compatible with the recording and reproducing apparatus employing the existing system.

SUMMARY OF THE INVENTION

Accordingly, it is a general object of the present invention to provide a novel and useful high density signal recording and reproducing apparatus in which the problems described heretofore are eliminated.

Another and more specific object of the present invention is to provide a high density signal recording and reproducing apparatus in which the rotational speed of a disc is set to 1/N times a standard rotational speed of a conventional disc of the same size so as to divide one track which is formed as the disc undergoes one revolution into N track parts, where N is an integer greater than one, and a digital signal is recorded and reproduced on and from the N track parts with an existing recording format. According to the recording and reproducing apparatus of the present invention, the apparatus assumes a recording or reproducing mode only during a scanning period in which a designated arbitrary track part out of the N track parts is scanned in one revolution time period of the disc, and assumes a non-recording (or non-reproducing) mode during scanning periods in which the remaining non-designated N-1 track parts are scanned. Hence, the memory capacity per track becomes N times that of the conventional disc, but the data transfer speed and the recording format remain the same as those of the conventional (existing) apparatus. For this reason, the digital signal can be recorded on and reproduced from the disc by use of an existing operating system, and a high density recording and reproduction can be carried out while maintaining compatibility with the existing recording and reproducing apparatuses.

Other objects and further features of the present invention will be apparent from the following detailed description when read in conjunction with the accompanying drawings.

BRIEF DESCRIPTION OF THE DRAWINGS

FIG. 4 is a flow chart for explaining the operation of a CPU in the recording and reproducing apparatus shown in FIG. 1 at the time of a recording;

FIG. 5 schematically shows one track consisting of a plurality of track parts formed on the disc by the recording and reproducing apparatus according to the present invention;

FIG. 6 schematically shows one track consisting of two divided track parts formed on the disc by the recording and reproducing apparatus according to the present invention;

FIGS. 7(A), 7(B), 8(A) through 8(C), 9(A) through 9(E), and 10 respectively show signal waveforms for explaining the operation of the recording and reproducing apparatus according to the present invention;

FIG. 11 is a flow chart for explaining the operation of the CPU in the recording and reproducing apparatus shown in FIG. 1 at the time of a reproduction;

FIG. 12 is a flow chart for explaining the operation of a CPU when the operation of a predetermined circuit part in FIG. 1 is performed by the CPU;

DETAILED DESCRIPTION

Figure 1:
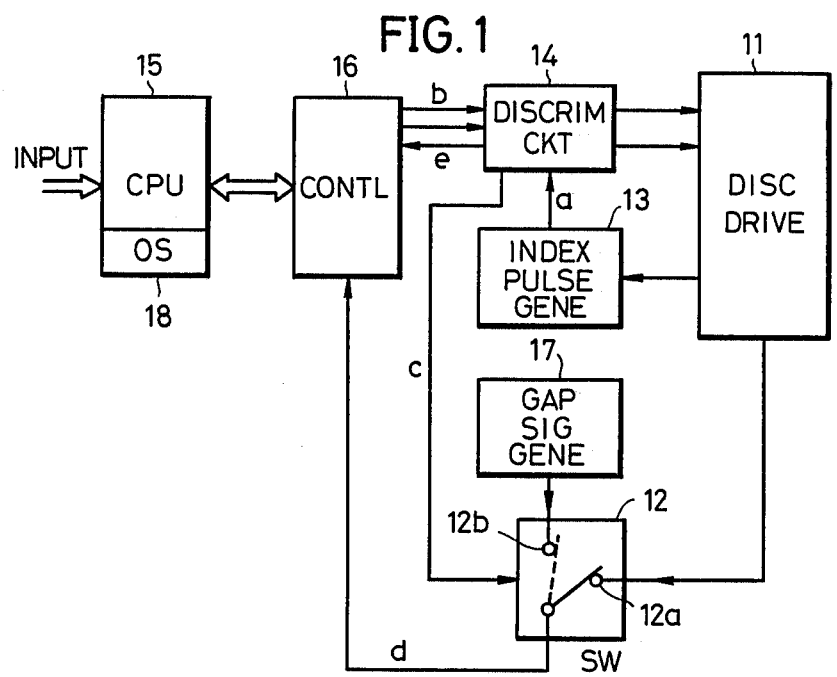
FIG. 1 is a system block diagram showing a first embodiment of the recording and reproducing apparatus according to the present invention.

FIG. 1 is a system block diagram showing the first embodiment of the recording and reproducing apparatus according to the present invention. The recording and reproducing apparatus comprises a known floppy disc drive (disc recording and reproducing apparatus) 11, a switching circuit 12, an index pulse generating circuit 13, a discriminating circuit 14, a central processing unit (CPU) 15 which operates with an operating system 18, a floppy disc controller 16, and a gap signal generating circuit 17. The disc drive 11 records and reproduces a digital signal on and from tracks which are formed concentrically on a floppy disc (not shown), with an existing recording format.

Figure 2:
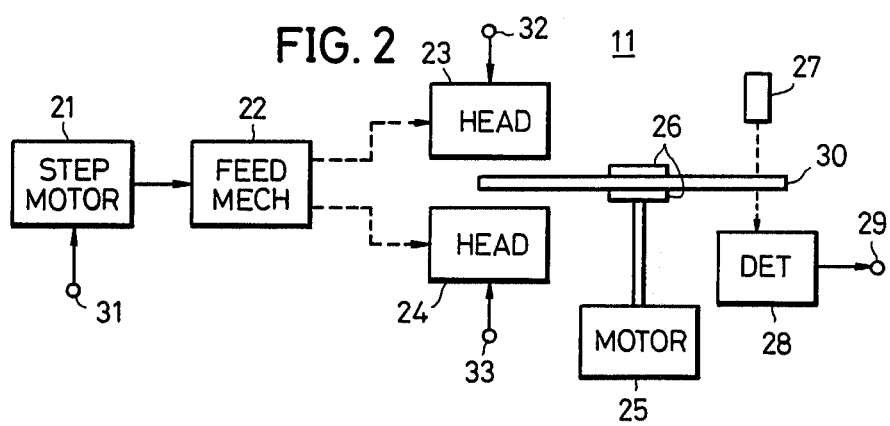
FIG. 2 is a general system block diagram showing an example of a disc drive in the recording and reproducing apparatus shown in FIG. 1.

An example of the disc drive 11 is generally shown in FIG. 2. The disc drive 11 generally comprises a stepping motor 21, a head moving mechanism 22, first and second magnetic heads 23 and 24, a motor 25, clampers 26, a light emitting element 27, and a photodetector 28. A floppy disc 30 is normally accommodated within a case and is used in the state accommodated within the case, however, the illustration of the case is omitted in FIG. 2. The disc 30 is clamped by the clampers 26 and is rotated at a predetermined rotational speed by the motor 25. An index signal for indicating the rotational position of the disc 30 is recorded as a hole at one point on the inner peripheral part of the disc 30. Light emitted from the light emitting element 27 is detected by the photodetector 28 when the light passes through the hole in the disc 20, and the photodetector 28 generates an index pulse every time the light from the light emitting element 27 is received. The index pulse is obtained through a terminal 29. The head moving mechanism 22 is driven by the stepping motor 21, and moves the first and/or second heads 23 and/or 24 in a radial direction of the disc 30. For example, when a signal containing instructions to move the first head 23 in the inner peripheral direction of the disc 30 by one track is applied to a terminal 31, the stepping motor 21 is rotated in a forward direction (or reverse direction) over a predetermined angle and the head moving mechanism 22 moves the first head 23 in the inner peripheral direction of the disc 30 by one track. The digital signal to be recorded on the disc 30 is supplied to the first and second heads 23 and 24 through respective terminals 32 and 33. The digital signal reproduced from the disc 30 by the first and second heads 23 and 24 is obtained through the respective terminals 32 and 33. The second head 24 may be omitted when the recording and reproduction only need to be carried out with respect to one side of the disc.

Figure 3:
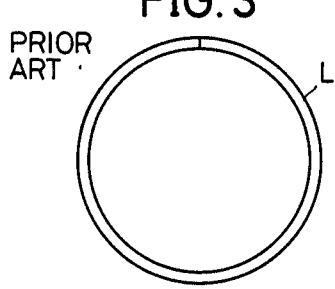
FIG. 3 schematically shows one track formed on a conventional disc.

FIG. 3 schematically shows one track out of a plurality of tracks which are formed concentrically on a conventional disc. The one track has a length L, and for example, a digital signal of B bytes is recorded on this one track. The data transfer speed is equal to S, for example.

On the other hand, the recording and reproducing apparatus according to the present invention carries out the recording and reproduction in a state where the rotational speed of the disc is set to 1/N a standard rotational speed of the conventional disc of the same size, where N is an integer greater than one. For this reason, it is possible to record and reproduce the digital signal with a high density which is N times that of the conventional disc, with the existing recording format while maintaining the data transfer speed identical to the data transfer speed S of the conventional apparatus.

At the time of the recording, the CPU 15 enters the data which is to be recorded in a step 41 shown in FIG. 4. The entered data is converted into a digital signal having a recording format in accordance with the operating system 18, in a step 42. The CPU 15 enters the track data related to the track and the track parts on which the digital signal is to be recorded, in a step 43. The entered digital signal and the track data are supplied to the controller 16 in a step 44, and the digital signal is recorded on the track part which is designated by the track data by the disc drive 11. For example, a CPU 80286 manufactured by Intel Corporation of the United States may be used as the CPU 15.

FIG. 5 schematically shows one track out of a plurality of tracks which are formed concentrically on the disc by the recording and reproducing apparatus according to the present invention. As shown in FIG. 5, the one track having the length L is divided into N track parts $t_1, t_2, t_3, \ldots$, and $t_N$. Each of the track parts $t_1$ through $t_N$ has a length $L/N$, and B bytes of the digital signal is recorded on and reproduced from each of the track parts $t_1$ through $t_N$. Accordingly, the memory capacity per track becomes N times that of the conventional disc, and a high density recording and reproduction can be carried out.

As described before, the existing disc drive generates one index pulse per revolution of the disc so that the rotational position of the disc can be detected, and the index signal is used as a signal for indicating the start of the format and the like. That is, the format is processed in terms of one track on the disc. Hence, in order to carry out the high density recording and reproduction of the digital signal by use of the existing disc drive, the index pulse must be generated N times per revolution of the disc, in correspondence with each track part of one track.

The index pulse generating circuit 13 shown in FIG. 1 is supplied with the index pulse which is generated from the disc drive 11 at the rate of once per revolution of the disc, as a reference index pulse, and generates N index pulses per revolution of the disc. In the case where the disc drive 11 has the construction shown in FIG. 2, for example, the index pulse which is generated by the photodetector 28 and obtained through the terminal 29 is supplied as the reference index pulse to the index pulse generating circuit 13. The index pulse generated by the index pulse generating circuit 13 is supplied to the discriminating circuit 14. For example, the index pulse generating circuit 13 may be constituted by a circuit which multiplies the reference index pulse by N.

Figure 8:
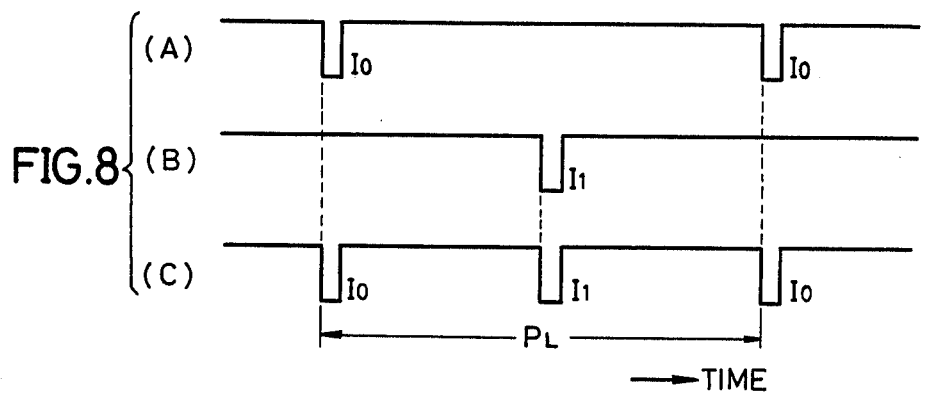
Figure 9:
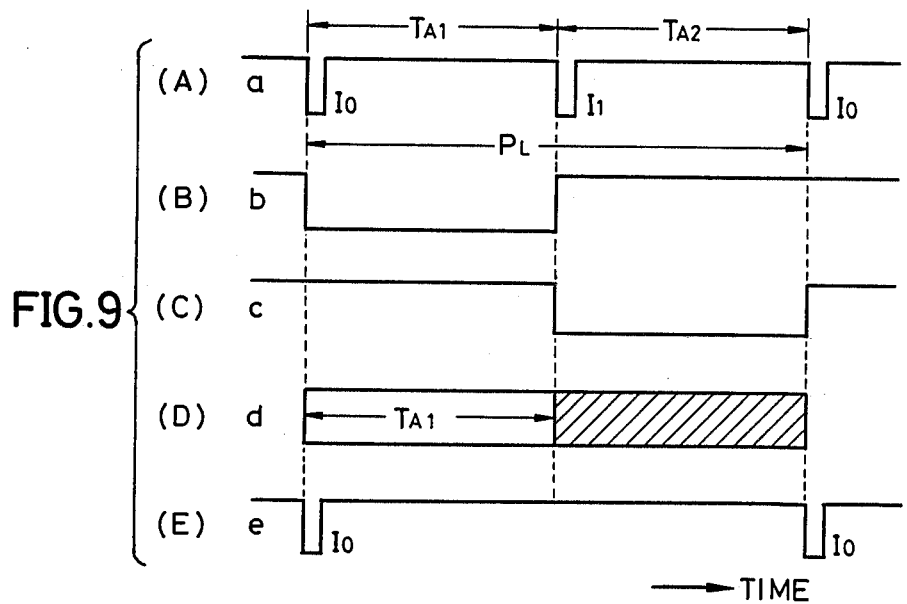

For convenience' sake, description will hereinafter be given for a case where one track on the disc is divided into two track parts (that is, $N=2$), and the digital signal is recorded with the existing recording format on track parts $A_1$ and $A_2$ of one track as shown in FIG. 6. In this case, the rotational speed of the disc is reduced to ½ the standard rotational speed of the conventional disc of the same size. Consequently, in a time period $2P_C$ (two revolution time periods of the conventional disc) in which the index pulse $I_0$ is generated twice when playing the conventional disc as shown in FIG. 7(A), the index pulse I is generated once in a time period $P_L$ ($=2P_C$) in the present embodiment as shown in FIG. 7(B). Hence, the index pulse generating circuit 13 may be designed to add the index pulse $I_0$ shown in FIG. 8(A) and the index pulse $I_1$ shown in FIGS. 8(B) so as to generate two index pulses in one revolution time period (the time period $P_L$ corresponding to the length L of the track) of the disc as shown in FIGS. 8(C) and 9(A). In this case, the index pulse $I_0$ is obtained from the photodetector 28 shown in FIG. 2, for example, and the index pulse $I_1$ which differs in phase by 180° with respect to the index pulse $I_0$ may be obtained from a photodetector which receives light emitted from a light emitting element provided opposite to the light emitting element 27 with respect to the center of the disc.

Since tehre are two track parts $A_1$ and $A_2$ in one track, an error is introduced during the processing of the format when the digital signal is reproduced from both the track parts $A_1$ and $A_2$ in one revolution time period of the disc. In other words, the digital signal can only be reproduced from one track part in one revolution time period of the disc. Hence, a selected one of the track parts $A_1$ and $A_2$ must be made valid.

Accordingly, when a selecting instruction which contains an instruction for processing only the digital signal reproduced from the track part $A_1$ is generated from the CPU 15 shown in FIG. 1, for example, the controller 16 generates a signal b shown in FIG. 9(B) responsive to the selecting instruction and supplies this signal b to the discriminating circuit 14. Based on the signal b, the discriminating circuit 14 supplies to the disc drive 11 an operation stop signal for stopping the recording or reproducing operation of the disc drive 11 during a scanning period in which the track part $A_2$ is scanned. In addition, the discriminating circuit 14 also receives a first index pulse signal a shown in FIG. 9(A) from the index pulse generating circuit 13, and selectively passes only the index pulse $I_0$ corresponding to selected track part $A_1$ as a second index pulse signal e shown in FIG. 9(E). As a result, the recording or reproduction of the digital signal is stopped during the scanning period of the track $A_2$ indicated by the hatchings in FIG. 6, and the recording or reproduction of the digital signal is only carried out during the scanning period of the selected track $A_1$. In other words, the non-selected track part $A_2$ is discriminated in the discriminating circuit 14. In the case where the track part $A_2$ is selected, the track part $A_1$ is similarly discriminated in the discriminating circuit 14 as being the non-selected track part.

At the time of the reproduction, it is desirable in most cases to obtain a continuous reproduced signal. Hence, the discriminating circuit 14 applies a pause signal c shown in FIG. 9(C) to the switching circuit 12, so as to connect the switching circuit 12 to a terminal 12a during the high-level period of the pulse signal c and to connect the switching circuit 12 to a terminal 12b during the low-level period of the pulse signal c. The reproduced digital signal obtained from the terminal 32 shown in FIG. 2, for example, is applied to the terminal 12a, and a gap signal generated in a gap signal generating circuit 17 is applied to the terminal 12b. The gap signal indicates a time period in which the recording or reproduction is not carried out, and contains data of a predetermined fixed value such as "4E" in hexadecimal. As shown schematically in FIG. 9(D), a signal d time divisionally comprising the digital signal reproduced from the selected track part $A_1$ during the scanning period $T_{A1}$ of the track part $A_1$ and the gap signal during the scanning period $T_{A2}$ of the non-selected track part $A_2$, is obtained from the switching circuit 12. The signal d is supplied to the controller 16, and the controller 16 performs no operation in a time period corresponding to the gap signal part of the signal d.

Figure 10:
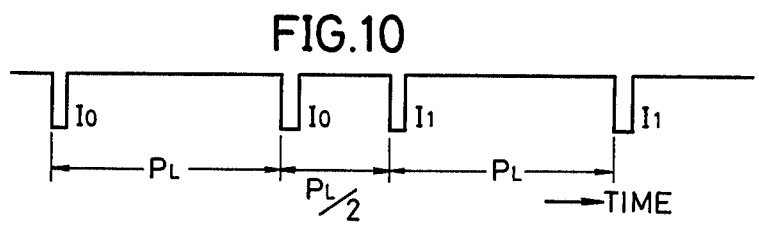

The controller 16 which constitutes an external host system of the disc drive 11 together with the CPU 15 and the operating system 18, is supplied with the index pulse signal e shown in FIG. 9(E) from the discriminating circuit 14. That is, the index pulse $I_0$ or $I_1$ is supplied to the controller 16 in one revolution time period of the disc. However, in a case where the track part $A_2$ is selected after the scanning period $T_{A1}$ of the track part $A_1$ which is in the same one track, the index pulse is supplied to the controller 16 from the discriminating circuit 14 in a sequence $I_0 \rightarrow I_0 \rightarrow I_1 \rightarrow \ldots$ as shown in FIG. 10, and the interval between the index pulses is no longer constant. But even in such a case, a waiting time between a time when the selecting instruction related to the track part which is to be selected for the recording or reproduction and a time when the digital signal is actually recorded on or reproduced from the selected track part, is approximately the same as the waiting time required in the case of the conventional disc, and no problems are introduced from the point of view of processing the digital signal.

In addition, since one track on the disc is divided into N track parts according to the apparatus of the present invention, the recording or reproduction will be carried out with respect to an incorrect track part (track position) when the track data (track shift instruction) from the host system is used as it is. Hence, the discriminating circuit 14 counts N (N=2 in the present embodiment) step pulses for instructing the track shift, which step pulses are obtained from the controller 16, and a track shift pulse is supplied to the disc drive 11 so as to shift to the designated track position only when N step pulses are counted. In other words, the number of step pulses is divided by 1/N, and the track shift instruction from the controller 16 is divisionally processed as a track shift instruction and an index pulse selecting instruction. When it is assumed that the conventional disc comprises tracks $C_1, C_2, \ldots$ in this sequence, the digital signal is recorded on or reproduced from each of the tracks in the sequence $C_1 \rightarrow C_2 \rightarrow \ldots$ every time one step pulse is obtained in the conventional apparatus. On the other hand, when it is assumed that the disc such as that shown in FIG. 5 comprises tracks $E_1, E_2, \ldots$ in this sequence and each of the tracks consists of track parts $E_{1a}$ and $E_{1b}$, $E_{2a}$ and $E_{2b}, \ldots$, the digital signal is recorded on or reproduced from the track parts in the sequence $E_{1a} \rightarrow E_{1b} \rightarrow E_{2a} \rightarrow E_{2b} \rightarrow \ldots$ every time one step pulse is obtained in the apparatus according to the present invention. Hence, in the apparatus of the present invention, the track which is being scanned is changed from one track to another track, that is, from the track $E_1$ to the track $E_2$, for example, every time two step pulses are obtained.

As described heretofore, according to the apparatus of the present invention, it is possible to record and reproduce the digital signal on and from the disc with a high density which is N times that of the coventional disc, by use of the existing operating system 18 and the existing recording format.

FIG. 11 is a flow chart for explaining the operation of the CPU 15 at the time of the reproduction. First, the track data (selecting instruction) related to the track and the track part from which the digital signal is to be reproduced, is entered in a step 51. The entered track data is supplied to the controller 16 in a step 52. The disc drive 11 reproduces the digital signal from the track part which is designated by the track data, and the reproduced digital signal from the disc drive 11 is entered through the controller 16 in a step 53. The reproduced digital signal is decoded in accordance with the operating system 18 in a step 54, and the decoded data is supplied to an external device (not shown) or the controller 16. In a case where the decoded data includes a command instructing reproduction of a predetermined data from the disc, for example, the command is supplied to the controller 16.

The operation of the switching circuit 12, the index pulse generating circuit 13, the discriminating circuit 14, and the gap signal generating circuit 17 may be performed by a central processing unit (CPU). In this case, a CPU Z80 manufactured by Zilog of the United States may be used as the CPU. The operation of the CPU in this case will now be described in conjunction with the flow chart shown in FIG. 12. FIG. 12 shows the operation of the CPU for the case where the digital signal is to be selectively reproduced from the track part $A_1$. The signal b from the controller 16 is entered in a step 61, and discrimination is made to determine whether or not the level of the signal b is low in a step 62. The step 62 is repeated until the discrimination result becomes YES. When the discrimination result in the step 62 becomes YES, the digital signal reproduced from the track part $A_1$ in the disc drive 11 is entered in a step 63. The index pulse signal e is supplied to the controller 16 in a step 64, and a discrimination is made to determine whether or not the level of the signal b is low in a step 65. When the discrimination result in the step 65 is YES, the reproduced digital signal from the track part $A_1$ is supplied to the controller 16 in a step 66, and the operation is returned to the step 65. On the other hand, when the discrimination result in the step 65 is NO, the gap signal is generated and the operation stop signal for stopping the recording or reproducing operation of the disc drive 11 during a scanning period in which the track part $A_2$ is scanned is supplied to the disc drive 11, in a step 67. Discrimination is made to determine whether or not the level of the index pulse signal e is low in a step 68. The step 68 is repeated until the discrimination result becomes YES. When the discrimination result in the step 68 becomes YES, the generation of the gap signal is stopped in a step 69. As a result, the signal d shown in FIG. 9(D) is generated from the CPU and supplied to the controller 16.

Figure 13:
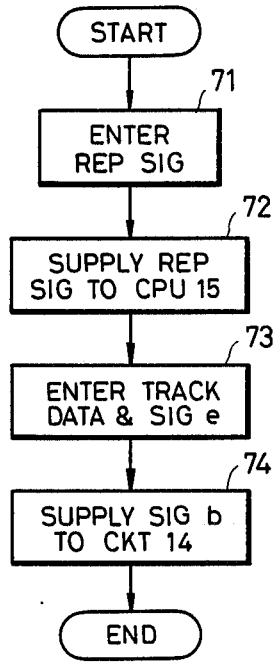
FIG. 13 is a flow chart for explaining the operation of a disc controller in the recording and reproducing apparatus shown in FIG. 1.

A known controller such as a controller PD765 manufactured by Nippon Electric Co., Ltd. of Japan may be used as the controller 16. In the case, the controller 16 operates in accordance with the flow chart shown in FIG. 13, for example. The reproduced digital signal (including the gap signal) is entered from the switching circuit 12 in a step 71, and the reproduced digital signal is supplied to the CPU 15 in a step 72. The track data and the like from the CPU 15 and the index pulse signal e from the discriminating circuit 14 are entered in a step 73. The signal b and the like are supplied to the discriminating circuit 14 in a step 74 in accordance with the track data and the index pulse signal e.

Figure 14:
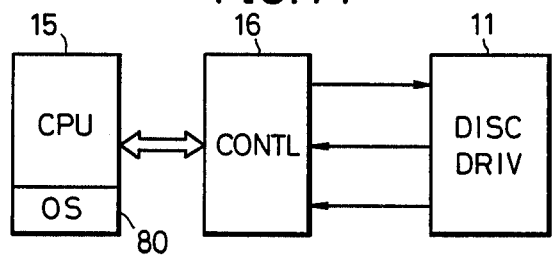
FIG. 14 is a system block diagram showing a case where a recording format of the digital signal is changed.

It is possible to increase the memory capacity per track to N times that of the conventional disc by changing the operating system and the recording format and increasing the number of sectors per track to N times that of the conventional disc. FIG. 14 is a system block diagram for this case where the memory capacity is increased to N times that of the conventional disc. In FIG. 14, those parts which are the same as those corresponding parts in FIG. 1 will be designated by the same reference numerals, and description thereof will be omitted. In FIG. 14, the reproduced digital signal and the reference index pulse from the disc drive 11 are supplied to the controller 16. On the other hand, the signal for shifting the track position is supplied to the disc drive 11 from the controller 16. An operating system 80 is used exclusively with the changed recording format which is different from the existing recording format.

Figure 15:
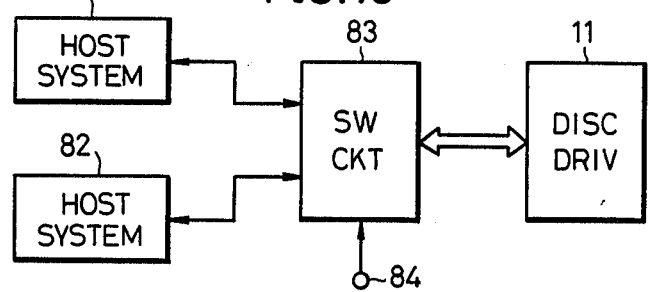
FIG. 15 is a system block diagram showing a second embodiment of the recording and reproducing apparatus according to the present invention.

Next, description will be given with respect to the second embodiment of the recording and reproducing apparatus according to the present invention by referring to FIG. 15. A host system 81 is constituted by the CPU 15, the controller 16, and the operating system 18 shown in FIG. 1. On the other hand, a host system 82 is constituted by the CPU 15, the controller 16, and the operating system 80 shown in FIG. 14, for example. A switching circuit 83 comprises a circuit part including the switching circuit 12, the index pulse generating circuit 13, the discriminating circuit 14, and the gap signal generating circuit 17 shown in FIG. 1. A signal for designating the host system to be used, is applied to a terminal 84. In the caes where the host system 81 is designated, the switching circuit 83 couples the host system 81 to the disc drive 11 through the circuit part of the switching circuit 83. But when the host system 82 is designated, the switching circuit 83 couples the host system 82 to the disc drive 11 directly.

In the description given heretofore, the embodiments are described for the case where the recording medium is a floppy disc. However, the recording and reproducing apparatus according to the present invention is perfectly applicable to other recording mediums such as the Winchester disc, an optical disc and the like.

Further, the present invention is not limited to these embodiments, but various variations and modifications may be made without departing from the scope of the present invention.

What is claimed is:

1. A high density signal recording and reproducing apparatus adapted to operate under a control of a central processing unit with a predetermined operating system, for recording and reproducing a digital signal on and from a disc, said predetermined operating system being primarily designed for a predetermined signal format of the digital signal and, for a predetermined rotational speed of the disc, thus defining a predetermined recording density of the digital signal on the disc, said apparatus being suitable for recording the digital signal with a recording density which his N times said predetermined recording density, where N is a finite integer greater than one, by reducing a rotational speed of the disc from the predetermined rotational speed without changing said predetermined operating system, said high density signal recording and reproducing apparatus comprising:

a disc drive for rotating the disc at a rotational speed which is 1/N times said predetermined rotational speed;

recording and reproducing means for recording and reproducing the digital signal on and from the disc which is rotated by said disc drive, said digital signal being recorded on and reproduced from the disc on which the recording density is N times said predetermined recording density so that N divided track parts of one track are formed on the disc in one revolution time period of the disc;

index pulse generating means for generating N index pulses in one revolution time period of the disc;

track part selecting means for generating a selecting instruction which selects and designates an arbitrary track part on and from which the digital signal is to be recorded and reproduced out of the N track parts of one track;

discriminating means response to said selecting instruction for generating a switching signal and an operation stop signal for stopping a recording or reproducing operation of said recording and reproducing means during a scanning period in which the remaining N-1 track parts excluding said arbitrary track part are scanned by said recording and reproducing means, and for passing out of the N index pulses obtained from said index pulse generating means in one revolution time period of the disc only one index pulse corresponding to said arbitrary track part; and switching means responsive to said switching signal for selectively passing and supplying the reproduced digital signal from said recording and reproducing means to said track part selecting means only during a time period in which the digital signal is reproduced from said arbitrary track part.

2. A recording and reproducing apparatus as claimed in claim 1 in which said track part selecting means includes said central processing unit and a disc controller, said central processing unit converting the digital signal into said predetermined signal format in accordance with said predetermined operating system and supplying the digital signal to said disc controller at the time of a recording, said disc controller being supplied with the reproduced digital signal from said switching means and supplying the reproduced digital signal to said central processing unit at the time of a reproduction, said one index pulse corresponding to said arbitrary track part and obtained from said discriminating means being supplied to said disc controller.

3. A recording and reproducing apparatus as claimed in claim 1 which further comprises gap signal generating means for generating a gap signal, said switching means selectively passing said gap signal during a time period other than the time period in which the digital signal is reproduced from said arbitrary track part responsive to said switching signal.

4. A recording and reproducing apparatus as claimed in claim 3 in which said index pulse generating means, said discriminating means, said switching means, and said gap signal generating means are a part of said central processing unit.

5. A recording and reproducing apparatus as claimed in claim 1 in which said index pulse generating means comprises a circuit for multiplying a reference index pulse which is generated from said disc drive at a rate of once per revolution time period of the disc by N so as to generate the N index pulses in one revolution time period of the disc.

* * * * *